United States Patent
Roh et al.

(10) Patent No.: US 8,351,550 B2
(45) Date of Patent: Jan. 8, 2013

(54) CORRELATION APPARATUS AND METHOD FOR FREQUENCY SYNCHRONIZATION IN BROADBAND WIRELESS ACCESS COMMUNICATION SYSTEM

(75) Inventors: Hee-Jin Roh, Suwon-si (KR); Jeoung-Gil Lee, Suwon-si (KR); Su-Jin Yoon, Suwon-si (KR); Hoon Kang, Jeju-si (KR); Chang-Hyun Baik, Suwon-si (KR); Jun-Kyu Kang, Seoul (KR); Hyung-Jin Choi, Seoul (KR); Se-Bin Im, Suwon-si (KR); Dae-Hong Lee, Suwon-si (KR)

(73) Assignees: Samsung Electronics Co., Ltd., Suwon-si (KR); Sungkyunkwan University Foundation for Corporate Collaboration, Suwon-si (KR)

( * ) Notice: Subject to any disclaimer, the term of this patent is extended or adjusted under 35 U.S.C. 154(b) by 1015 days.

(21) Appl. No.: 12/363,484

(22) Filed: Jan. 30, 2009

(65) Prior Publication Data

US 2009/0196383 A1  Aug. 6, 2009

(30) Foreign Application Priority Data

Feb. 1, 2008  (KR) .................... 10-2008-0010538

(51) Int. Cl.
  *H03D 1/00*  (2006.01)
(52) U.S. Cl. ........ 375/343; 375/137; 375/142; 375/145; 375/150; 375/149
(58) Field of Classification Search ............ 375/343, 375/142, 150, 137, 145, 149, E1.008, E1.018
  See application file for complete search history.

(56) References Cited

U.S. PATENT DOCUMENTS 6,088,411 A * 7/2000 Powierski et al. ............ 375/364
6,134,286 A * 10/2000 Chennakeshu et al. ........ 375/365
6,226,337 B1 * 5/2001 Klank et al. .................. 375/367

(Continued)

FOREIGN PATENT DOCUMENTS

WO  2007/109195 A2  9/2007

OTHER PUBLICATIONS

"Robust Integer Frequency offset estimator with Ambiguity of Symbol Timing Offset for OFDM Systems", VTC 2002-Fall. 2002 IEEE 56th, Vehicular Technology Conference Proceedings. Vancouver, Canada, Sep. 24-28, 2002. vol. 4, pp. 2116-2120. Myonghee Park et al.

"A Frequency Synchronization Method for 3GPP LTE OFDMA System in TDD Mode" Communications and Information Technology, 2009. ISCIT 2009. 9th International Symposium on, IEEE, Piscataway, NJ, USA, Sep. 28, 2009, pp. 864-868. Myung Jun Shim et al.

*Primary Examiner* — David Ometz
*Assistant Examiner* — Rahel Guarino
(74) *Attorney, Agent, or Firm* — Jefferson IP Law, LLP (57) ABSTRACT

A correlation apparatus and method for frequency synchronization are provided. A frequency synchronization method of a receiver in a broadband wireless access communication system includes acquiring a highest correlation value by conducting a differential correlation of a variable interval between a received signal and a reference signal and performing a frequency synchronization according to the highest correlation value.

12 Claims, 7 Drawing Sheets

U.S. PATENT DOCUMENTS

| | | | |
|---|---|---|---|
| 6,400,784 B1 * | 6/2002 | Ben-Eli | 375/365 |
| 6,959,050 B2 * | 10/2005 | Baum et al. | 375/326 |
| 2003/0026295 A1 | 2/2003 | Baum et al. | |
| 2003/0043947 A1 * | 3/2003 | Zehavi et al. | 375/365 |
| 2004/0184564 A1 * | 9/2004 | Chen et al. | 375/330 |
| 2007/0030797 A1 * | 2/2007 | Baek | 370/208 |
| 2008/0170560 A1 * | 7/2008 | Im et al. | 370/350 |
| 2008/0267303 A1 * | 10/2008 | Baldemair et al. | 375/260 |

* cited by examiner

CORRELATION APPARATUS AND METHOD FOR FREQUENCY SYNCHRONIZATION IN BROADBAND WIRELESS ACCESS COMMUNICATION SYSTEM

PRIORITY

This application claims the benefit under 35 U.S.C. §119 (a) of a Korean patent application filed in the Korean Intellectual Property Office on Feb. 1, 2008 and assigned Ser. No. 10-2008-0010538, the entire disclosure of which is hereby incorporated by reference.

BACKGROUND OF THE INVENTION

1. Field of the Invention

The present invention relates to a correlation apparatus and method for frequency synchronization in an Orthogonal Frequency Division Multiplexing (OFDM) system. More particularly, the present invention relates to a correlation apparatus and method for enhancing a frequency synchronization performance in a system that uses a Zadoff Chu (ZC) sequence or a Constant Amplitude Zero-AutoCorrelation (CAZAC) sequence as its reference signal.

2. Description of the Related Art

In an Orthogonal Frequency Division Multiplexing (OFDM) transmission scheme, subcarriers are transmitted having orthogonality to one another. In transmission, while the orthogonality between subcarriers should be sustained, a frequency interval between subcarriers is relatively small for the transmission band. Hence, compared to a single carrier transmission, the OFDM transmission is sensitive to the frequency offset caused by an oscillator mismatch between a transmitter and a receiver.

At an OFDM receiver, the frequency offset is estimated in two steps. First, a fine frequency offset smaller than the subcarrier interval is estimated. Secondly, the frequency offset is estimated per subcarrier interval.

In general, to accurately detect the frequency offset of the received signal in an OFDM transmission system, a reference signal such as a preamble is inserted in the head of a frame.

The reference signal is transmitted in a form that is agreed upon by the transmitter and the receiver. The receiver conducts the frequency synchronization using the received signal and the reference signal.

A Zadoff Chu (ZC) sequence, which is a conventional Constant Amplitude Zero-AutoCorrelation (CAZAC) sequence, features good Peak-to-Average Power Ratio (PAPR) and auto-correlation properties.

The ZC sequence is used as the synchronization reference signal in various systems including not only the OFDM transmission system but also Single Carrier-Frequency Domain Equalization (SC-FDE) systems and Ultra Wide Band (UWB) systems.

However, the ZC sequence disadvantageously degrades the correlation characteristic in the conventional coarse frequency offset detection.

That is, using the relative frequency offset, the detection performance of the coarse frequency offset corresponding to an integer part deteriorates.

Accordingly, there is a need for an apparatus and method for improved frequency synchronization in a broadband wireless access communication system

SUMMARY OF THE INVENTION

An aspect of the present invention is to address at least the above mentioned problems and/or disadvantages and to provide at least the advantages described below. Accordingly, an aspect of the present invention is to provide a correlation apparatus and method for frequency synchronization in a broadband wireless access communication system.

Another aspect of the present invention is to provide a correlation apparatus and method for frequency synchronization that avoids degradation of a correlation characteristic of a coarse frequency offset detection in a broadband wireless access communication system.

According to an aspect of the present invention, a frequency synchronization method of a receiver in a broadband wireless access communication system is provided. The method includes acquiring a highest correlation value by conducting a differential correlation of a variable interval between a received signal and a reference signal and performing a frequency synchronization according to the highest correlation value.

According to another aspect of the present invention, a frequency synchronization apparatus of a receiver in a broadband wireless access communication system is provided. The apparatus includes a frequency synchronizer for acquiring a highest correlation value by conducting a differential correlation of a variable interval between a received signal and a reference signal and a frequency controller for performing a frequency synchronization according to the highest correlation value.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments the present invention will become more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a correlation apparatus and method for frequency synchronization in a broadband wireless access communication system.

At an Orthogonal Frequency Division Multiplexing (OFDM) receiver, a frequency offset is estimated largely in two steps.

First, a fine frequency offset smaller than a subcarrier interval is estimated. Secondly, the frequency offset is estimated per subcarrier interval.

To compensate for the performance degradation in a Zadoff Chu (ZC) sequence, a correlation scheme according to an exemplary implementation of the present invention modifies a conventional differential detection method.

In an exemplary embodiment of the present invention, when the receiver conducts the differential detection, the correlation with neighbor subcarriers is not taken into account as in the conventional method. Rather, the correlation characteristic is enhanced by varying the differential interval.

Figure 1:
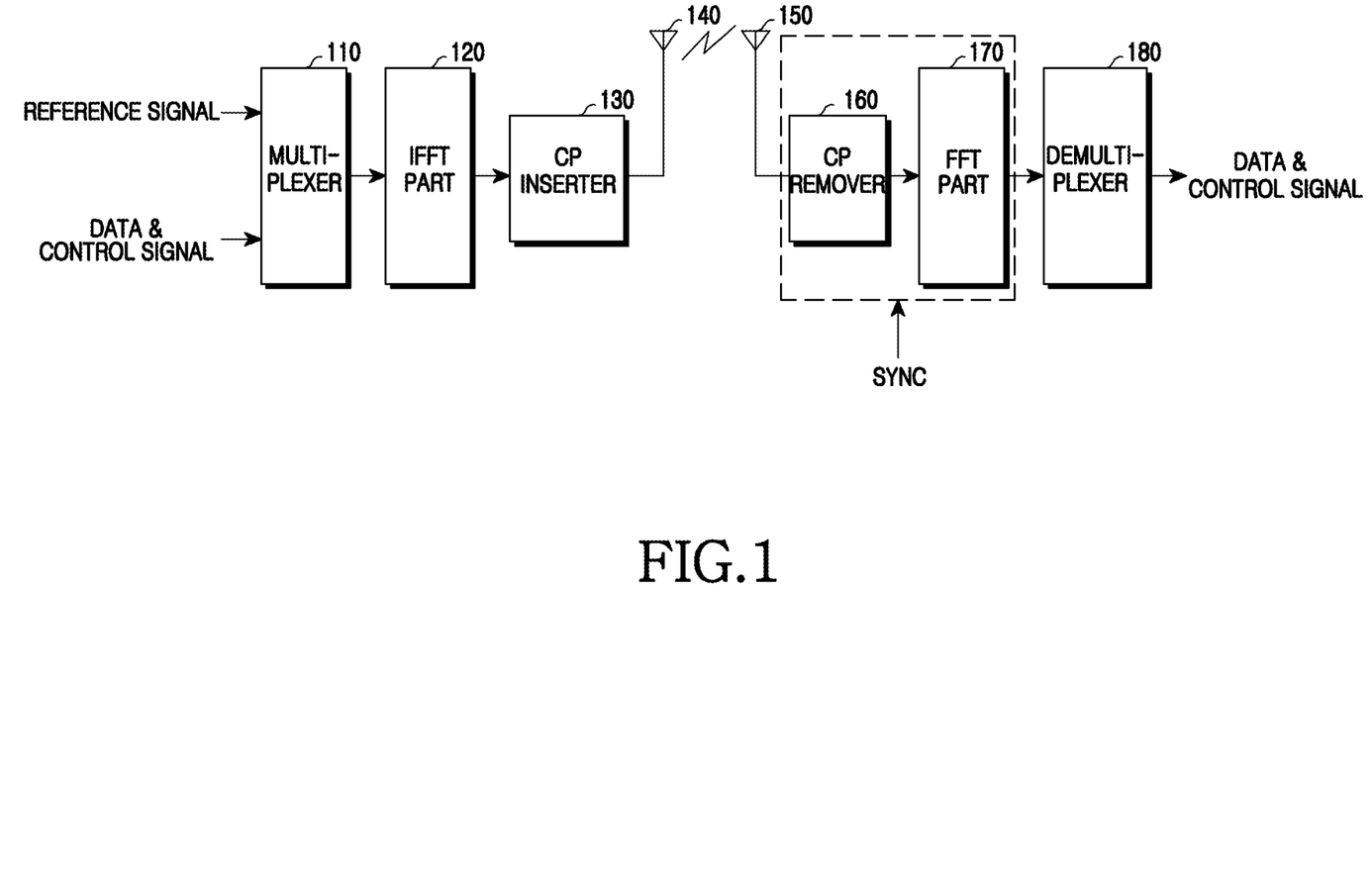
FIG. 1 illustrates a transmitter and a receiver of an Orthogonal Frequency Division Multiplexing (OFDM) transmission system according to an exemplary embodiment of the present invention.

FIG. 1 illustrates a transmitter and a receiver of an OFDM transmission system according to an exemplary embodiment of the present invention.

Referring to FIG. 1, the OFDM transmission system includes a multiplexer 110, an Inverse Fast Fourier Transform (IFFT) part 120, a Cyclic Prefix (CP) inserter 130, a transmit antenna 140, a receive antenna 150, a CP remover 160, an FFT part 170, and a demultiplexer 180.

The multiplexer 110 combines a reference signal, data, and a control signal in a preset order at preset positions. The IFFT part 120 converts the frequency-domain signal output from the multiplexer 110 to a time-domain signal. The CP inserter 130 inserts a CP into the signal output from the IFFT part 120. The signal output from the CP inserter 130 is transmitted via the transmit antenna 140 in a radio channel.

From the signal received at the receive antenna 150, the CP is removed at the CP remover 160. Next, the time-domain signal is converted to the frequency-domain signal at the FFT part 170 and separated to the data and the control signal of the transmit signal at the demultiplexer 180.

For the stable demodulation, the received signal passes through synchronization in the time domain and in the frequency domain.

Figure 2:
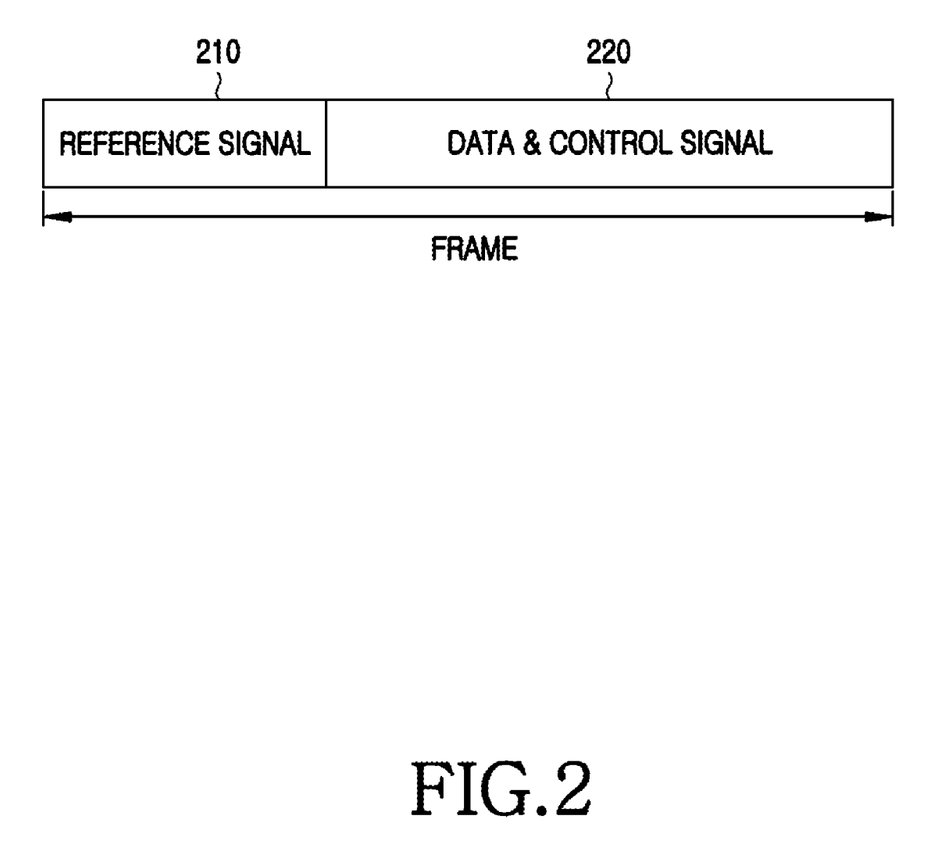
FIG. 2 illustrates a frame structure for frequency synchronization according to an exemplary embodiment of the present invention.

FIG. 2 depicts a frame structure for frequency synchronization according to an exemplary embodiment of the present invention.

A reference signal 210 is disposed at the front of the frame. Data and a control signal 220 are disposed after the reference signal.

Figure 3:
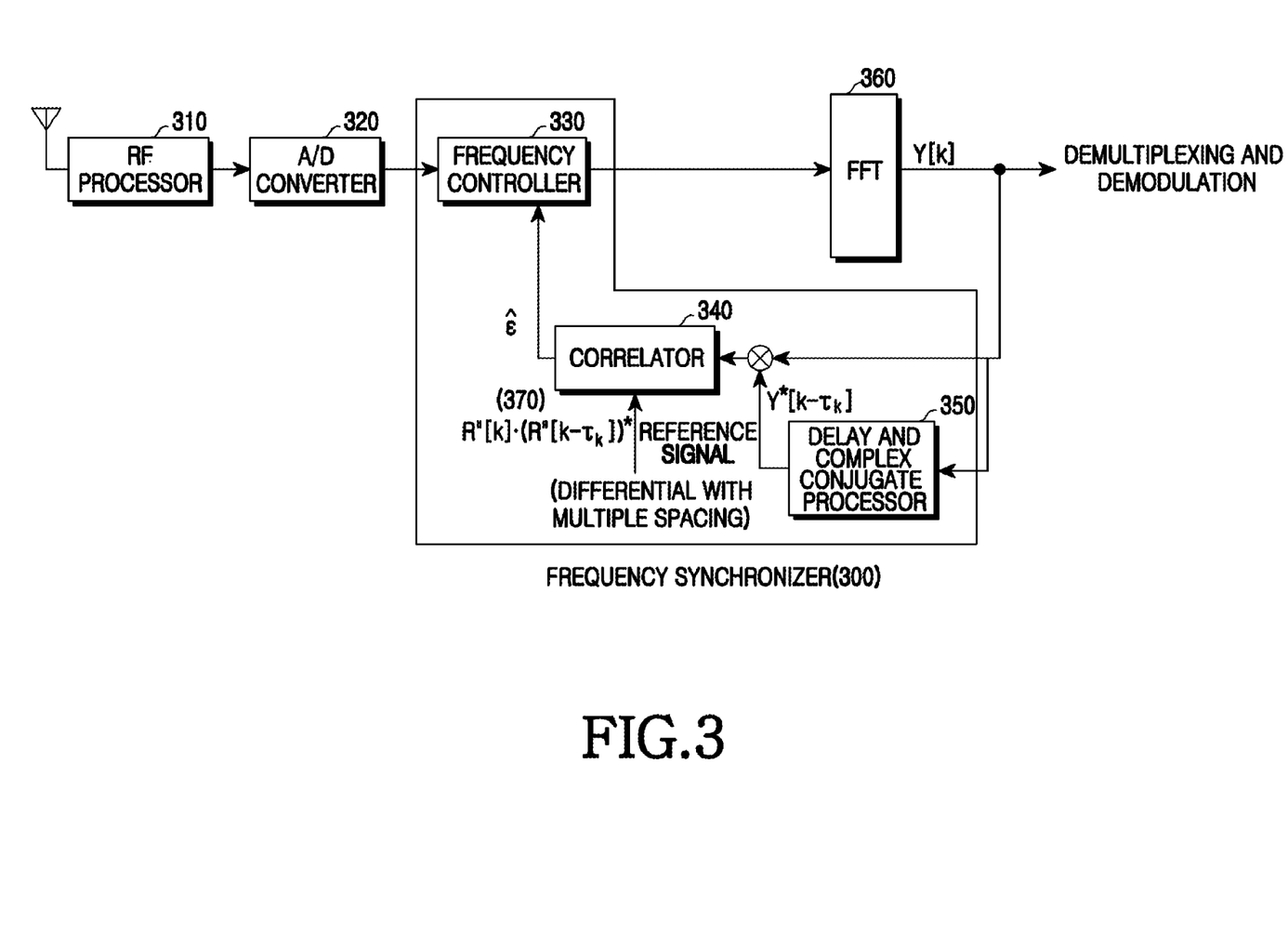
FIG. 3 illustrates a coarse frequency synchronization structure in a OFDM transmission system using a Zadoff Chu (ZC) sequence as a reference signal according to an exemplary embodiment of the present invention.

FIG. 3 is a block diagram of a coarse frequency synchronization structure in an OFDM transmission system using a ZC sequence as a reference signal according to an exemplary embodiment of the present invention.

Referring to FIG. 3, the receiver includes a Radio Frequency (RF) processor 310, an Analog/Digital (A/D) converter 320, a frequency synchronizer 300, and an FFT part 360. The frequency synchronizer 300 includes a delay and complex conjugate processor 350, a correlator 340, and a frequency controller 330.

The signal received via the antenna is processed to a baseband signal at the RF processor 310, converted to a digital signal at the A/D converter 320, and then fed to the frequency synchronizer 300.

The coarse frequency synchronization based on the differential detection can be expressed as Equation (1) wherein the receive signal after the FFT part 360 is Y[k].

$$\hat{\varepsilon} = \arg_i \max \left[ \left| \sum_{k=0}^{N_{FFT}-1} \frac{\{Y[k-i]Y^*[k-i-\tau_k]\}}{R''[k](R''[k-\tau_k])^*} \right| \right] \quad (1)$$

In Equation (1), $N_{FFT}$ denotes an FFT size and R"[k] denotes a signal after the differential correlation is performed on the reference signal in the same pattern as the receive signal. $\tau_k$ denotes a differential correlation interval according to a subcarrier index k. $\hat{\varepsilon}$ denotes the highest correlation value between the reference signal and the receive signal. Y[ ] denotes the receive signal after the FFT processing.

S, which is a maximum correlation interval defined by considering a coherence bandwidth according to a channel environment, can be expressed as Equation (2).

$$\tau_k = (k \bmod S) + 1 \quad (2)$$

In Equation (2), mod denotes a modulo operation. The correlation interval iterates from the minimum 1 to the maximum S according to the subcarrier index. $\tau_k$ denotes the variable interval, that is, $\tau_k$ denotes the differential correlation interval according to the subcarrier index k.

R"[k] of Equation (1) is the signal after the differential correlation is conducted on the reference signal in the same pattern as the receive signal and can be expressed as Equation (3).

$$R''[k] = R[k-\tau_k]R^*[k] \quad (3)$$

In Equation (3), R[k] denotes the reference signal agreed between the transmitter and the receiver and is defined as Equation (4).

$$R[k] = \begin{cases} \exp\left[\dfrac{-j\pi m k^2}{L}\right], & L \text{ is even} \\ \exp\left[\dfrac{-j\pi m k(k+1)}{L}\right], & L \text{ is odd} \end{cases} \quad (4)$$

In Equation (4), L denotes a length of the ZC sequence and m denotes a delimiter.

The frequency offset output from the correlator 340 through the differential correlation of the various intervals based on Equation (1), is provided to the frequency controller 330.

The frequency controller 330 performs the synchronization using the frequency offset.

In more detail, the delay and conjugate complex processor 350 delays the receive signal after the FFT part 360 by $\tau_k$ and conducts the complex conjugate processing (acquires the complex conjugate).

Next, the output signal of the delay and complex conjugate processor 350 is multiplied by the received signal after the FFT part 360. The product signal Y[k]Y*[k−$\tau_k$], which is hereafter referred to as a signal A, is fed to the correlator 340.

The correlator 340 repeatedly acquires the differential correlation value of the product signal 370, which is referred to as a signal D, and the signal A for a preset number of times $N_{FFT}$, determines the highest correlation value, and provides the highest correlation value to the frequency controller 330. The product signal D is acquired by multiplying the product (Equation (3)), which is referred to as a signal B, of the signal delayed from the reference signal by $\tau_k$ and the complex conjugate of the reference signal, by a conjugate complex, which is referred to as a signal C, of the signal delayed from the signal B by $\tau_k$. In short, the signal D is the product of the signal B and the signal C. Herein, the signal D is given by Equation (5).

$$R''[k](R''[k-\tau_k])^* \qquad (5)$$

R"[k] is defined in Equation (3).

The highest correlation value is determined based on Equation (1). The frequency controller 330 performs the synchronization according to the highest correlation value.

Figure 4:
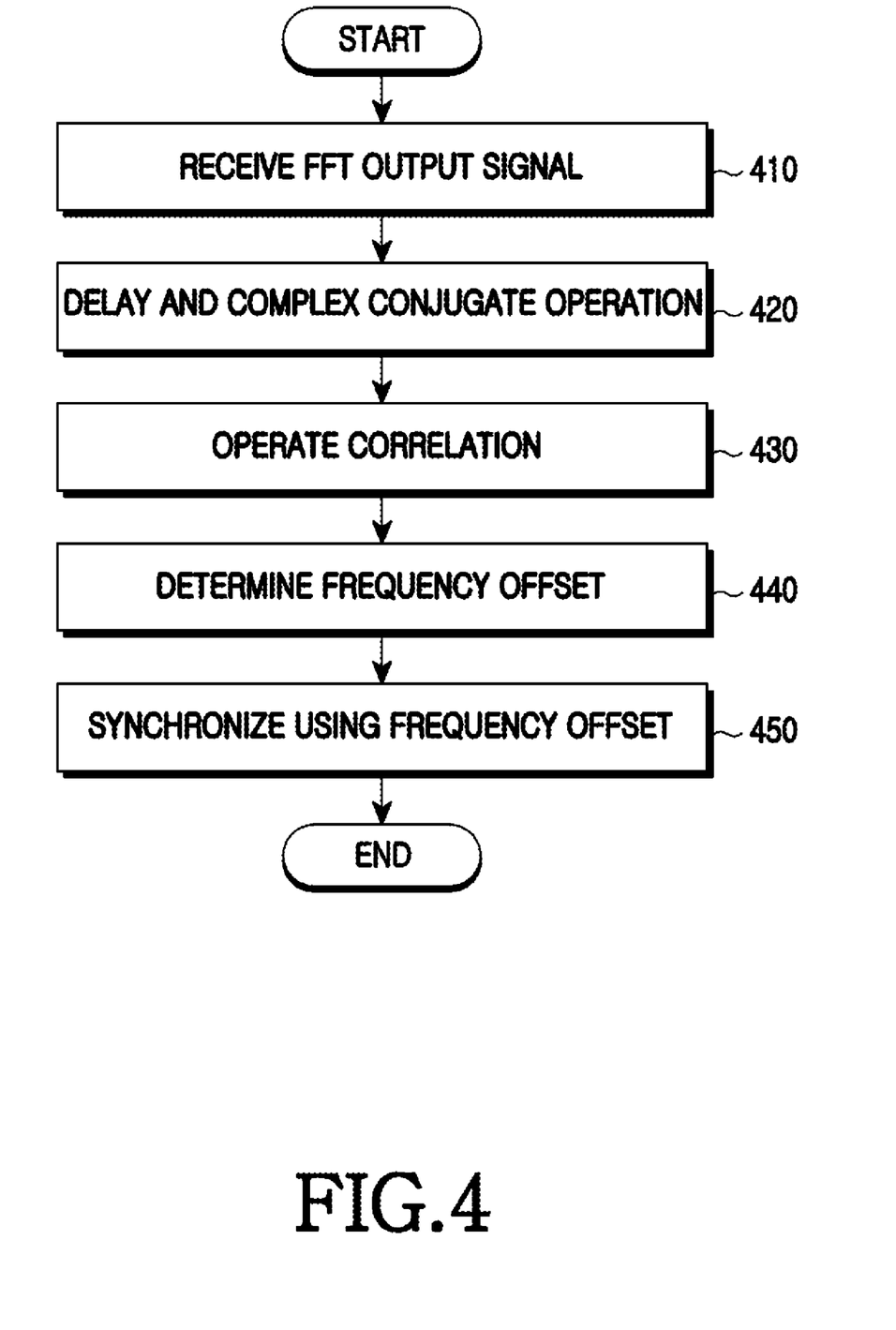
FIG. 4 illustrates a coarse frequency synchronization in an OFDM transmission system using a ZC sequence as a reference signal according to an exemplary embodiment of the present invention.

FIG. 4 is a flowchart outlining a coarse frequency synchronization in an OFDM transmission system using a ZC sequence as a reference signal according to an exemplary embodiment of the present invention.

Referring to FIG. 4, the delay and complex conjugate processor receives the signal after the FFT from the FFT part in step 410, and delays the signal by $\tau_k$ and processes (acquires) the complex conjugate in step 420.

The output signal of the delay and the complex conjugate processor is multiplied by the receive signal after the FFT part and the product signal A Y[k]Y*[k−$\tau_k$] is fed to the correlator.

The correlator repeatedly acquires the differential correlation value of the product signal D 370 of the signal B, which is the product of the signal delayed from the reference signal by $\tau_k$ and the complex conjugate of the reference signal, and the signal C, which is the complex conjugate of the signal delayed from the signal B by $\tau_k$, in relation with the signal A for a preset number of times $N_{FFT}$ in step 430, determines the highest correlation value in step 440, and provides the highest correlation value to the frequency controller.

The highest correlation value is determined based on Equation (1). The frequency controller performs the synchronization according to the highest correlation value in step 450.

Next, this process is finished.

Figure 5:
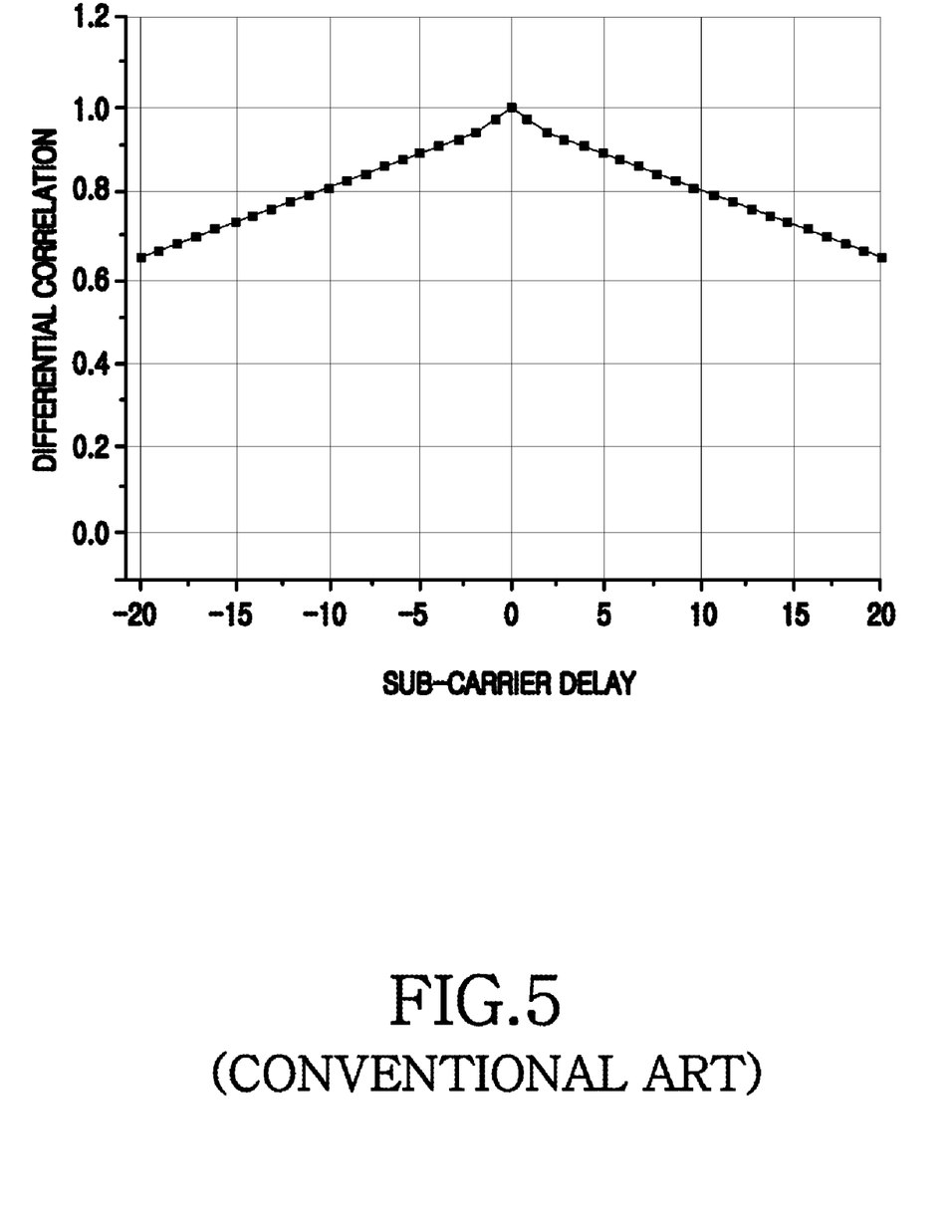
FIG. 5 illustrates a correlation characteristic in a conventional differential detection method.

FIG. 5 is a graph showing the correlation characteristic in a conventional differential detection method. When the maximum correlation points are utilized, there is no significant difference in the magnitude of the neighbor correlation values.

Figure 6:
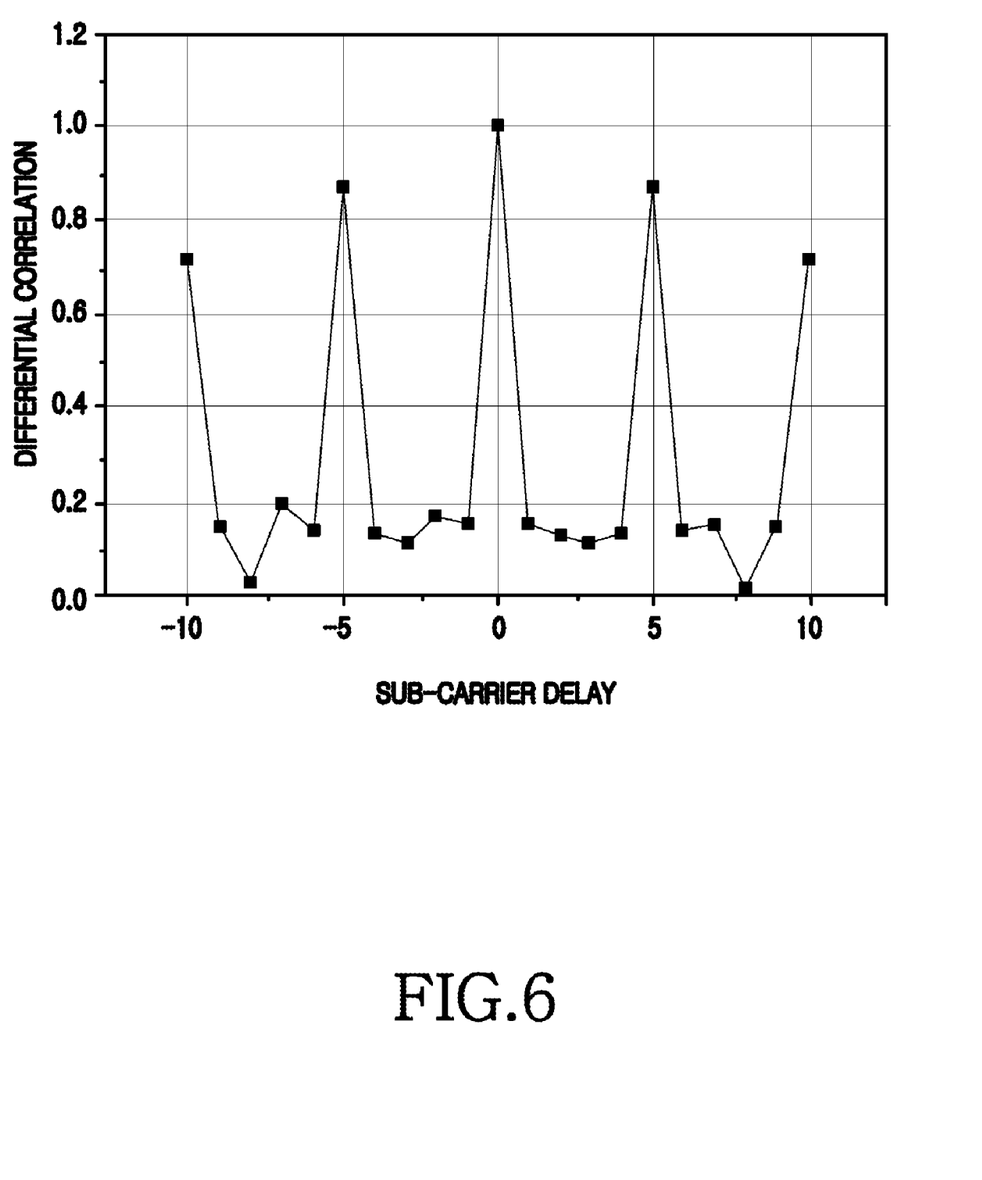
FIG. 6 illustrates a correlation characteristic in an exemplary embodiment of the present correlation method.

FIG. 6 is a graph showing the correlation characteristic according to an exemplary embodiment of the present correlation method, where the magnitude of the correlation values around the maximum correlation points are notably reduced compared to the characteristic of the conventional differential correlation.

Figure 7:
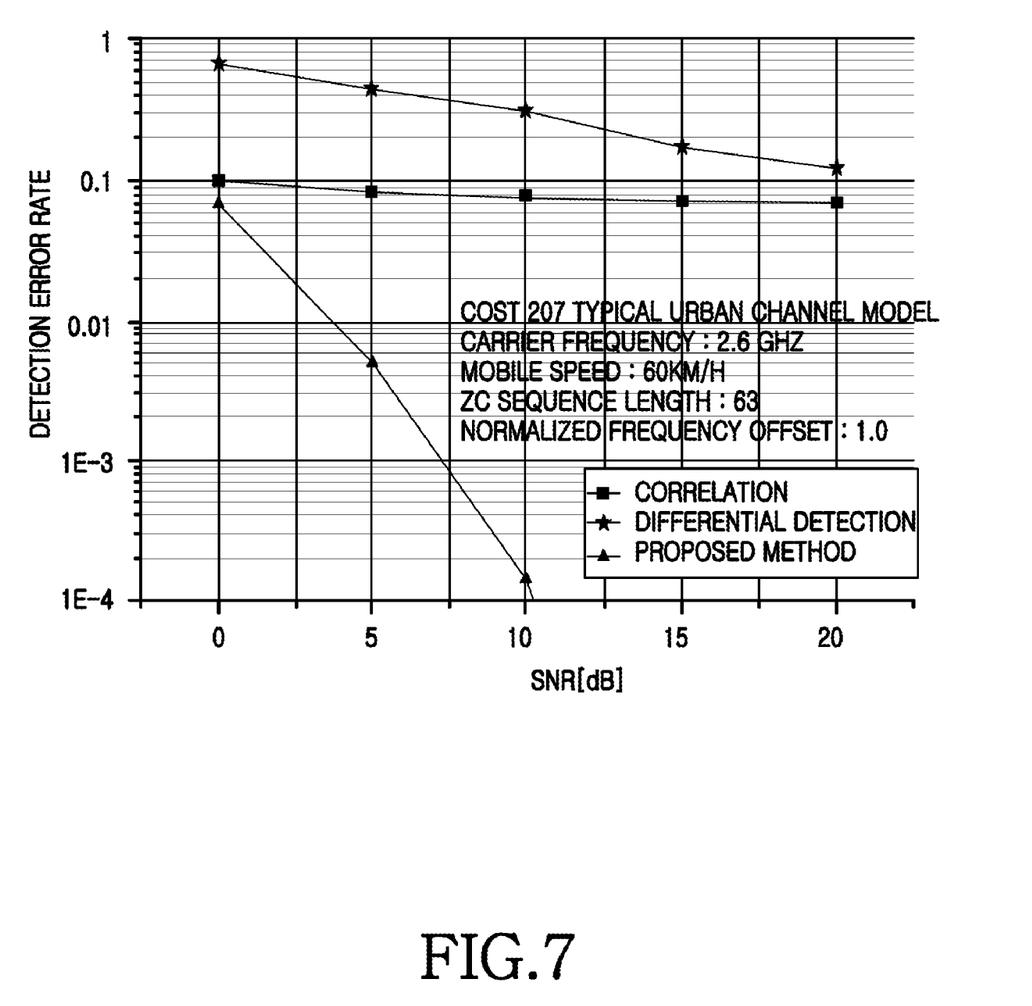
FIG. 7 illustrates a frequency offset detection error rate in comparison with the conventional method.

The simulation for examining the performance of the coarse frequency offset detection method according to the correlation scheme is repeated in the multipath fading environment over a sufficient number of times and its statistical data is recorded in FIG. 7.

FIG. 7 is a graph for comparing a frequency offset detection error rate with the conventional method.

To assess the performance, the maximum differential correlation interval S is set to 6, the carrier frequency is set to 2.6 GHz, a mobile speed is set to 60 km/h, and the frequency offset observation range is set to −1≦ε≦1.

In FIG. 7, the Detection Error Rate (DER) of the coarse frequency offset is compared based on a Subcarrier to Noise Ratio (SNR).

$$\varepsilon = \Delta \frac{f}{T^{-1}} = \Delta fT \qquad (6)$$

In Equation (6), the frequency offset ε is acquired by normalizing the actual frequency offset Δf to the reciprocal of the sequence interval T.

In FIG. 7, at the SNR 10 dB, the DER of the general correlation method is about 0.075, the DER of the differential detection method is about 0.2, and the DER of the coarse frequency offset detection method of the present correlation method is about 1.5×10⁻⁴.

The conventional simple correlation method scarcely enhances the performance according to the increase of the SNR because of the signal distortion and the timing error from the multipath fading channel. The conventional differential detection method exhibits the worst performance because the correlation characteristic is degraded in the ZC sequence.

As one can see from FIG. 7, in the actual reception environment, the frequency offset detection method according to an exemplary embodiment of the present correlation scheme exhibits the better performance than the conventional coarse frequency offset detection methods.

An exemplary coarse frequency offset detection method of the present correlation scheme can enhance the coarse frequency synchronization performance in the actual reception environment of the OFDM transmission system under the multipath fading.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A frequency synchronization method of a receiver in a broadband wireless access communication system, the method comprising:
    acquiring a highest correlation value by conducting a differential correlation of a variable interval between a received signal and a reference signal; and
    performing a frequency synchronization according to the highest correlation value.

2. The method of claim 1, wherein the acquiring of the highest correlation value by conducting the differential correlation of the variable interval between the received signal and the reference signal comprises:
    a first operation of multiplying the received signal, which is delayed by the variable interval after a Fast Fourier Transform (FFT) processing and by passing through a complex conjugate processing, by a first delay signal after the FFT processing;
    a second operation of multiplying a second signal, the second signal being delayed from the reference signal by the variable interval, by a complex conjugate of the reference signal in order to generate a output signal;
    a third operation of multiplying the output signal of the second operation by a complex conjugate of a second delay signal delayed from the output signal of the second operation by the variable interval; and
    a fourth operation of acquiring the highest correlation value by determining correlation values of an output signal of the first operation and an output signal of the third operation.

3. The method of claim 2, wherein the second operation multiplies the second signal by the complex conjugate of the reference signal based on the following equation:

$$R[k-\tau_k]R^*[k]$$

where R[k] denotes a reference signal agreed between a transmitter and the receiver and $\tau_k$ denote the variable interval, and wherein R[k] is expressed as the following equation, $$R[k] = \begin{cases} \exp\left[\dfrac{-j\pi m k^2}{L}\right], & L \text{ is even} \\ \exp\left[\dfrac{-j\pi m k(k+1)}{L}\right], & L \text{ is odd} \end{cases}$$

where L denotes a length of a Zadoff Chu (ZC) sequence and m denotes a delimiter.

4. The method of claim 2, wherein the third operation multiplies the output signal of the second operation by the complex conjugate of the second delay signal by the variable interval based on the following equation:

$$R''[k](R''[k-\tau_k])^*$$

where $R''[k]=R[k-\tau_k]R^*[k]$ and $\tau_k$ and $\tau_k$ denote the variable interval.

5. The method of claim 2, wherein the fourth operation acquires the highest correlation value by determining the correlation values of the output signal of the first operation and the output signal of the third operation based on the following equation:

$$\hat{\varepsilon} = \arg\max_i \left[ \left| \dfrac{\sum_{k=0}^{N_{FFT}-1} \{Y[k-i]Y^*[k-i-\tau_k]\}}{R''[k](R''[k-\tau_k])^*} \right| \right]$$

where $N_{FFT}$ denotes an FFT size, R''[k] denotes a signal after a differential correlation is performed on the reference signal in the same pattern as the received signal, $\tau_k$ denotes a differential correlation interval according to a subcarrier index k, $\hat{\varepsilon}$ denotes the highest correlation value between the reference signal and the received signal, and Y[ ] denotes the received signal after the FFT processing.

6. The method of claim 2, wherein the variable interval is determined based on the following equation:

$$\tau_k = (k \bmod S) + 1$$

where mod denotes a modulo operation, a correlation interval iterates from a minimum of 1 to a maximum of S according to a subcarrier index, $\tau_k$ denotes the variable interval, and S denotes a maximum correlation interval defined in consideration of a coherence bandwidth according to a channel environment.

7. A frequency synchronization apparatus of a receiver in a broadband wireless access communication system, the apparatus comprising:
a frequency synchronizer for acquiring a highest correlation value by conducting a differential correlation of a variable interval between a received signal and a reference signal; and
a frequency controller for performing a frequency synchronization according to the highest correlation value.

8. The apparatus of claim 7, wherein the frequency synchronizer comprises:
a delay and complex conjugate processor for generating a first signal by multiplying the received signal, which is delayed by the variable interval after a Fast Fourier Transform (FFT) processing and by passing through a complex conjugate processing, by a first delay signal after the FFT processing; and
a correlator for determining a third signal generated by multiplying a second signal, the second signal being delayed from the reference signal by the variable interval, by a complex conjugate of the reference signal in order to generate an output signal, and multiplying the output signal by a complex conjugate of a second delay signal delayed from the second signal by the variable interval, and for acquiring the highest correlation value by determining correlation values of the first signal and the third signal.

9. The apparatus of claim 8, wherein the correlator determines the second signal based on the following equation:

$$R[k-\tau_k]R^*[k]$$

where R[k] denotes a reference signal agreed between a transmitter and the receiver and $\tau_k$ denote the variable interval, R[k] expressed as the following equation, $$R[k] = \begin{cases} \exp\left[\dfrac{-j\pi m k^2}{L}\right], & L \text{ is even} \\ \exp\left[\dfrac{-j\pi m k(k+1)}{L}\right], & L \text{ is odd} \end{cases}$$

where L denotes a length of a Zadoff Chu (ZC) sequence and m denotes a delimiter.

10. The apparatus of claim 8, wherein the correlator determines the third signal based on the following equation:

$$R''[k](R''[k-\tau_k])^*$$

where $R''[k]=R[k-\tau_k]R^*[k]$ and $\tau_k$ denote the variable interval.

11. The apparatus of claim 8, wherein the correlator acquires the highest correlation value by determining the correlation values of the first signal and the third signal based on the following equation:

$$\hat{\varepsilon} = \arg\max_i \left[ \left| \dfrac{\sum_{k=0}^{N_{FFT}-1} \{Y[k-i]Y^*[k-i-\tau_k]\}}{R''[k](R''[k-\tau_k])^*} \right| \right]$$

where $N_{FFT}$ denotes an FFT size, R''[k] denotes a signal after a differential correlation is performed on the reference signal in the same pattern as the received signal, $\tau_k$ denotes a differential correlation interval according to a subcarrier index k, $\hat{\varepsilon}$ denotes the highest correlation value between the reference signal and the received signal, and Y[ ] denotes the received signal after the FFT processing.

12. The apparatus of claim 8, wherein the variable interval is calculated based on the following equation:

$$\tau_k = (k \bmod S) + 1$$

where mod denotes a modulo operation, a correlation interval repeats from minimum 1 to maximum S according to a subcarrier index, $\tau_k$ denotes the variable interval, and S denotes a maximum correlation interval defined in consideration of a coherence bandwidth according to a channel environment.

* * * * *